(12) United States Patent
Jiang et al.

(10) Patent No.: US 10,748,754 B2
(45) Date of Patent: Aug. 18, 2020

(54) ISOTOPE MASS SPECTROMETER

(71) Applicant: Shan Jiang, Beijing (CN)

(72) Inventors: Shan Jiang, Beijing (CN); Genming Jin, Beijing (CN)

(73) Assignee: Shan Jiang, Beijing (CN)

( * ) Notice: Subject to any disclaimer, the term of this patent is extended or adjusted under 35 U.S.C. 154(b) by 99 days.

(21) Appl. No.: 16/123,207

(22) Filed: Sep. 6, 2018

(65) Prior Publication Data

US 2020/0027712 A1    Jan. 23, 2020

(30) Foreign Application Priority Data

Jul. 17, 2018    (CN) .......................... 2018 1 0780924

(51) Int. Cl.
     *H01J 49/38*      (2006.01)
     *H01J 49/02*      (2006.01)

(52) U.S. Cl.
     CPC ............ *H01J 49/38* (2013.01); *H01J 49/025* (2013.01)

(58) Field of Classification Search
     None
     See application file for complete search history.

(56) References Cited

U.S. PATENT DOCUMENTS

| | | | |
|---|---|---|---|
| 6,455,844 B1* | 9/2002 | Meyer | B01D 59/48 250/281 |
| 7,439,498 B2* | 10/2008 | Litherland | B01D 59/44 250/282 |
| 8,791,409 B2* | 7/2014 | Makarov | H01J 49/005 250/282 |
| 9,697,998 B2* | 7/2017 | Nakamura | H01J 49/025 |
| 9,768,003 B2* | 9/2017 | Deerberg | H01J 49/025 |
| 10,186,410 B2* | 1/2019 | Eiler | H01J 49/0009 |
| 10,192,729 B2* | 1/2019 | Schwieters | H01J 49/24 |
| 10,395,910 B2* | 8/2019 | Jiang | H01J 49/30 |
| 10,403,487 B2* | 9/2019 | Schwieters | H01J 49/0027 |
| 2006/0113464 A1* | 6/2006 | Litherland | B01D 59/44 250/288 |
| 2009/0114809 A1* | 5/2009 | Hotchkis | B01D 59/44 250/282 |
| 2013/0103337 A1* | 4/2013 | Eiler | G16C 20/20 702/86 |
| 2014/0097338 A1* | 4/2014 | Eiler | H01J 49/04 250/282 |
| 2017/0154760 A1* | 6/2017 | Freeman | H01J 49/0086 |

\* cited by examiner

*Primary Examiner* — Andrew Smyth

(57) ABSTRACT

An isotope mass spectrometer including: an electron cyclotron resonance ion source, a front-end analysis device, a back-end analysis device and an ion detector; where the electron cyclotron resonance ion source is connected with the front-end analysis device, and is used for generating ion beams of multivalent charge states; the front-end analysis device is connected with the back-end analysis device, selects and separates the ion beams, and receives ion beams of constant, microscale and trace levels; the back-end analysis device is connected with the ion detector, and is used for eliminating a background of an isotope to be measured at an ultratrace level; and the ion detector is used for receiving ion beams of the ultratrace level, and carrying out energy measurement and separation on the ion beams of the ultratrace level, so as to obtain the isotope to be measured at the ultratrace level.

9 Claims, 1 Drawing Sheet

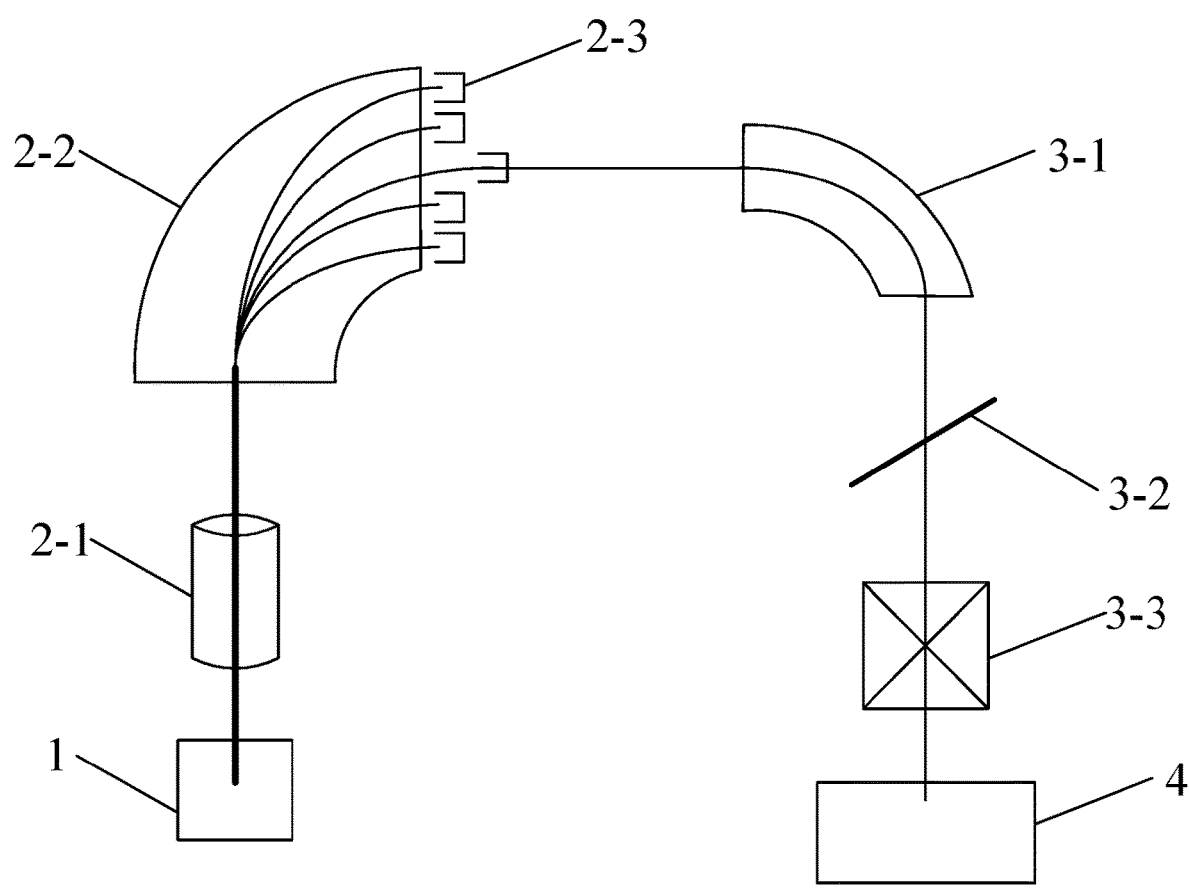

ISOTOPE MASS SPECTROMETER

CROSS-REFERENCE TO RELATED APPLICATIONS

This application claims priority to Chinese patent application number 201810780924.6, filed Jul. 17, 2018, with a title of ISOTOPE MASS SPECTROMETER. The above-mentioned patent application is incorporated herein by reference in its entirety.

BACKGROUND OF THE INVENTION

1. Field of Invention

The present invention relates to the field of mass spectrometry instruments, and in particular to an isotope mass spectrometer.

2. Background of Related Art

Mass spectrometry (referred to as MS hereinafter) is an MS that measures an isotopic abundance ratio of a sample, such as 3H/H, 13C/12C, and 18O/16O, etc. We can get trace information of the age and process of a substance by measuring an atomic number ratio of an isotope. MS is widely used in many academic disciplines such as geology, environment, archaeology, ocean, and the like.

A traditional isotope MS instrument mainly consists of an ion source system, a mass analyzer system, and an ion detector system. The isotope MS affects the measurement of abundance sensitivity due to the interferences from a molecular ion background and an isobaric heterotope ion background. For the measurement of 14C, in the measurement of isotopic abundance sensitivity by isotope MS, the ratio of 14C/12C can only reach $10^{-6}$-$10^{-8}$, i.e. falling into a trace analytical range.

Due to the deeply development of academic disciplines such as geology, environment, biomedicine, archaeology, ocean and the like, it demands continuously improvement of the abundance sensitivity level for measurement of an element isotope. Generally, it is required that the abundance sensitivity of measurement reach a range of $10^{-8}$-$10^{-15}$, i.e., an ultratrace range. Currently, the abundance sensitivity of the isotope MS instrument is far from meeting the demands of measurement.

SUMMARY OF THE INVENTION

An object of the present invention is to provide an isotope mass spectrometer to improve the abundance sensitivity of isotope MS measurement. To achieve the above purpose, the present invention provides the following solution.

An isotope mass spectrometer includes: an electron cyclotron resonance ion source, a front-end analysis device, a back-end analysis device and an ion detector; where the electron cyclotron resonance ion source is connected with the front-end analysis device, and is used for generating ion beams of multivalent charge states; the front-end analysis device is connected with the back-end analysis device, selects and separates the ion beams, and receives ion beams of constant, microscale and trace levels; the back-end analysis device is connected with the ion detector, and is used for eliminating a background of an isotope to be measured at an ultratrace level; and the ion detector is used for receiving ion beams of the ultratrace level, and carrying out energy measurement and separation on the ion beams of the ultratrace level, so as to obtain the isotope to be measured at the ultratrace level.

Optionally, the mass spectrometer further includes: an operation module; where the operation module is connected with an output end of the front-end analysis device, and is used for calculating isotopic abundance ratios of ion beams of constant, microscale and trace levels as received by the front-end analysis device; and the operation module is also connected with an output end of the ion detector, and is also used for calculating the abundance ratio of the isotope to be measured at the ultratrace level as obtained by the ion detector.

Optionally, the electron cyclotron resonance ion source is a positive ion source, which can generate ions of multivalent charge states for all elements from H to Pu, actinide elements, and transactinide elements.

Optionally, the front-end analysis device particularly includes: an acceleration section, a first magnetic analyzer and an ion receiver; where an ion output end of the acceleration section is connected with an input end of the first magnetic analyzer, and an output end of the first magnetic analyzer correspondingly fixes the ion receiver; the first magnetic analyzer is used for selecting and separating the accelerated ion beams; and the ion receiver is used for receiving the separated ion beams of constant, microscale and trace levels.

Optionally, the accelerating section is a single-stage electrostatic accelerating tube which has an accelerated beam intensity in a range of 10 μA-10 mA, and a working voltage of 10 kV-600 kV.

Optionally, the ion receiver is a set of Faraday cups, and the number of the Faraday cups is 5 to 9.

Optionally, the Faraday cups include a first Faraday cup and a second Faraday cup which have the same structure and different moving states; where the first Faraday cup is used for receiving the separated ion beams of constant, microscale and trace levels, and the second Faraday cup is used for transmitting the ion beams of the ultratrace level to the back-end analysis device.

Optionally, the back-end analysis device particularly includes: a first electrostatic analyzer, an energy absorption film, a second magnetic analyzer and a second electrostatic analyzer; where an input end of the first electrostatic analyzer is connected with an output end of the front-end analysis device, and the energy absorption film is fixed between an output end of the first electrostatic analyzer and an input end of the second magnetic analyzer; and an output end of the second magnetic analyzer is connected with an input end of the second electrostatic analyzer, and an output end of the second electrostatic analyzer is connected with the ion detector.

Optionally, the back-end analysis device particularly includes: an electrostatic analyzer, an energy absorption film and a speed selector; where an input end of the electrostatic analyzer is connected with an output end of the front-end analysis device, and the energy absorption film is fixed between an output end of the electrostatic analyzer and an input end of the speed selector; and an output end of the speed selector is connected with the ion detector.

Optionally, the ion detector is a solid detector or a gas detector. The solid detector is a thin-window or windowless solid detector, and the gas detector is a thin-window gas detector.

According to specific embodiments provided in the present invention, the present invention discloses the following technical effects:

First, the abundance sensitivity is improved. As having the ability of eliminating a molecular background and reducing an isobaric heterotope background, the isotope mass spectrometer of the present invention has significantly improved isotopic abundance sensitivity of measurement, which can reach a range of $10^{-8}$-$10^{-15}$. This range is higher than $10^2$-$10^7$ times higher than the range of $10^{-6}$-$10^{-8}$ of a traditional MS. The isotopic abundance measured by the traditional MS belongs to a microscale-trace range. The measuring range of the mass spectrometer of the present invention belongs to the trace-ultratrace range.

Second, the measuring speed is fast. The beam current of an ECR ion source is strong and in a range of 50-5,000 μA, which is 10-100 times higher than that of the traditional MS. Therefore, the measurement time will be greatly reduced.

Third, the dosage of the sample is small. The strong beam current of the ECR ion source mentioned above results from the high ionization efficiency of the sample. Therefore, the dosage of the sample is small in order to achieve the same measurement and statistical accuracy. For a solid sample, the dosage is generally in a range of 100-1,000 μg.

BRIEF DESCRIPTION OF THE DRAWING

To describe the technical solutions in the embodiments of the present invention or in the prior art more clearly, the following briefly describes the accompanying drawing required for describing the embodiments. Apparently, the accompanying drawing in the following description show some embodiments of the present invention, and a person of ordinary skill in the art may still derive other drawings from the accompanying drawing without creative efforts.

FIG. 1 is a schematic structural diagram of an isotope mass spectrometer of the present invention.

Correspondence relationships of reference numbers in the drawings: 1 represents a ECR ion source, 2-1 represents an acceleration section, 2-2 represents a magnetic analyzer, 2-3 represents an ion receiver, 3-1 represents an electrostatic analyzer, 3-2 represents an energy absorption film, 3-3 represents a speed selector, and 4 represents an ion detector.

DETAILED DESCRIPTION

The following clearly and completely describes the technical solutions in the embodiments of the present invention with reference to the accompanying drawings in the embodiments of the present invention. Apparently, the described embodiments are merely a part rather than all of the embodiments of the present invention. All other embodiments obtained by a person of ordinary skill in the art based on the embodiments of the present invention without creative efforts shall fall within the protection scope of the present invention.

There are three main factors that affect the abundance sensitivity of isotopic MS measurement, the first one is the beam intensity of an ion source; the second one is the transmission efficiency of ions; and the third is the level of the molecular background and the isobaric heterotope background. Among the three factors, the level of the molecular background and the isobaric heterotope background is the most important influencing factor. An object of the present invention is to propose an isotopic MS based on an electron cyclotron resonance (ECR) high-current ion source of a multi-charge state, i.e., ECR-MS, aiming at the main problems affecting the measurement sensitivity of the isotopic MS, i.e., the problems of the molecular background and the isobaric heterotope background. The device has the ability of eliminating the molecular background and the isobaric heterotope background, and meanwhile also has advantages of a strong beam current, high transmission efficiency and the like. Thus, the abundance sensitivity of the isotopic MS measurement is significantly improved.

To make the foregoing objective, features, and advantages of the present invention clearer and more comprehensible, the present invention is further described in detail below with reference to the accompanying drawings and specific embodiments.

FIG. 1 is a schematic structural diagram of the isotope mass spectrometer of the present invention. As shown in FIG. 1, the isotope mass spectrometer includes an ECR ion source 1, a front-end analysis device, a back-end analysis device, and an ion detector 4. The electron cyclotron resonance ion source 1 is connected with the front-end analysis device; the front-end analysis device is connected with the back-end analysis device; the back-end analysis device is connected with the ion detector 4; and the ion detector 4 is used for receiving ion beams of the ultratrace level, and carrying out energy measurement and separation on the ion beams of the ultratrace level to obtain the isotope to be measured at the ultratrace level.

The ECR ion source 1 is an ECR high-current ion source 1 of multi-charge states, which is mainly used for generating high-current ion beams of multivalent charge states such as 1+, 2+, 3+ and the like. For example, ions such as $C^+$, $C^{2+}$, $C^{3+}$, $C^{4+}$, and the like are generated. All of the ECR ion sources 1 of the present invention are positive ion sources, and ions of multivalent charge states such as 1+, 2+, 3+ and the like can be generated for all elements from H to Pu and even for all elements of actinides and transactinides.

The front-end analysis device selects and separates the ion beams and receives ion beams of constant, microscale and trace levels, so as to analyze the abundance ratios of the ion beams. The front-end analysis device includes an acceleration section 2-1, a first magnetic analyzer 2-2, and an ion receiver 2-3. An ion output end of the acceleration section 2-1 is connected with an input end of the first magnetic analyzer 2-2, and an output end of the first magnetic analyzer 2-2 correspondingly fixes the ion receiver 2-3. The accelerating section 2-1 is an accelerating tube with an working voltage in the range of 10 kV-600 kV, which is used for increasing the energy of ions and thus enabling a better mass resolution result after the ions pass through the first magnetic analyzer 2-2. The accelerating section of the present invention is a high-current single-stage electrostatic accelerating tube, which doesn't have any gas or solid stripper component and has an available accelerated beam intensity in the range of 10 μA-10 mA. The working voltage of the accelerating tube is most preferably in the range of 20 kV-150 kV. The first magnetic analyzer 2-2 (90 degrees) is used for selecting and separating the accelerated ion beams, selecting stable isotopes (including ion beams of constant, microscale and trace levels), and accordingly separating them to the corresponding ion receiver 2-3. The ion receiver 2-3 is used for receiving the separated ion beams of constant, microscale and trace levels. The ultratrace isotope is further introduced into the back-end analysis device through the ion receiver 2-3. The ion receiver 2-3 is a set of movable Faraday cups, usually 5-9 Faraday cups, and the position of each Faraday cup can be changed. Particularly, the Faraday cups include a first Faraday cup and a second Faraday cup which have the same structure and different moving states; where the first Faraday cup is used for receiving the separated ion beams of constant, microscale and trace levels, and the second Faraday cup is used for transmitting the ion beams of the ultratrace level to the back-end analysis device. In FIG. 1, each one of the upper two and the lower two Faraday cups is the first Faraday cup, and the Faraday cup at the middle is the second Faraday cup.

The back-end analysis device is used for eliminating the background of the isotope to be measured at the ultratrace level, namely eliminating interferences from isobaric heterotope ions and ions having the same charge-to-mass ratio as the isotope to be measured, and then further analyzing the abundance ratio ($10^{-8}$-$10^{-13}$) of the isotope at the ultratrace level. For example, when $14C^{4+}$ ions are measured, there is an interference from the isobaric heterotope $14N^{4+}$, and there is also an interference from the ions having the same charge-to-mass ratio (e.g., $7Li^{2+}$. $21Ne^{6+}$ and the like) as the ions to be measured. The back-end analysis device can effectively eliminate these backgrounds. The back-end analysis device particularly includes: an electrostatic analyzer 3-1, an energy absorption film 3-2 and a speed selector 3-3, where an input end of the electrostatic analyzer 3-1 is connected with an output end of the front-end analysis device, and the energy absorption film 3-2 is fixed between an output end of the electrostatic analyzer 3-1 and an input end of the speed selector 3-3; and an output end of the speed selector 3-3 is connected with the ion detector 4.

The speed selector 3-3 may be replaced by a magnetic analyzer and an electrostatic analyzer, and then the back-end analysis device particularly includes: a first electrostatic analyzer, an energy absorption film, a second magnetic analyzer and a second electrostatic analyzer; where an input end of the first electrostatic analyzer is connected with an output end of the front-end analysis device, and the energy absorption film is fixed between an output end of the first electrostatic analyzer and an input end of the second magnetic analyzer; and an output end of the second magnetic analyzer is connected with an input end of the second electrostatic analyzer, and an output end of the second electrostatic analyzer is connected with the ion detector. The second magnetic analyzer is smaller in size and power than the first magnetic analyzer 2-2.

The ion detector 4 is used for receiving ion beams of the ultratrace level, and carrying out energy measurement and separation on the ion beams of the ultratrace level to obtain the isotope to be measured at the ultratrace level. The ion detector 4 includes a solid detector or gas detector with high energy resolution, and electronics and data acquisition components. After the ions pass through the back-end analysis device, the interferences from the isobaric heterotope ions and ions having the same charge-to-mass ratio as the ions to be measured cannot be completely eliminated. By virtue of the characteristic that the energy of these interfering ions is obviously different from that of the ions to be measured, through the energy measurement carried out by the high-energy-resolution detector, the background interferences can be further identified and eliminated, and the ion beams of the trace level are separated to obtain the isotope to be measured at the ultratrace level, so as to analyze the abundance ratio of the isotope to be measured. The high-energy-resolution detectors of the present invention are of two types, one is a thin-window (with a thickness of 10 nm-50 nm) or windowless solid detector, and the other is a thin-window (20 nm-70 nm of silicon nitride material) gas detector.

The mass spectrometer of the present invention further includes an operation module. The operation module is connected with an output end of the front-end analysis device and an output end of the ion detector. The operation module obtains the abundance ratio of respective isotopes according to the ion beams of constant, microscale and trace levels as received by the front-end analysis device; and meanwhile the operation module can also calculate the abundance ratio of the isotope of the ultratrace level according to the isotope to be measured at the ultratrace level as obtained by the ion detector 4.

Therefore, the mass spectrometer of the present invention has expansion and improvement in the measuring capability in multiple aspects.

First, the range of nuclide measurement is increased. In the past, the isotopic MS can carry out measurement of a state isotope, but cannot carry out measurement of a long-lived radioactive isotope, including the measurement of an artificial nuclide, a cosmic-ray-produced nuclide, and the like, such as 14C, 10Be, 3H, 236U, 129I, Pu and the like isotopes. By using the mass spectrometer of the present invention, all of these nuclides can be measured.

Second, the sample preparation is simplified and the sample can be measured online. Since the ECR ion source is injected as a gas, the form of the sample may be of a gaseous state, a solid state and a liquid state. In this way, the sample preparation can be simplified, and some gas samples and solid samples can be processed and measured online. For example, online measurement of 14C, 3H, 131I, 129I, and inert gases such as Ar, Kr and Xe in the air can be realized.

Third, measurement of isotopic abundances of multiple elements in the same sample can be achieved. For example, when 14C and 3H in a graphite sample is measured, 10-50 μg of the graphite sample can be taken and introduced through a single injection, such that the isotopic abundance ratios of two elements, i.e., 14C/12C and 3H/H, can be measured at the same time. In the past, the isotopic MS cannot carry out such measurement.

Each embodiment of the present specification is described in a progressive manner, each embodiment focuses on the difference from other embodiments, and the same and similar parts between the embodiments may refer to each other.

Several examples are used for illustration of the principles and implementation methods of the present invention. The description of the embodiments is used to help illustrate the method and its core principles of the present invention. In addition, those skilled in the art can make various modifications in terms of specific embodiments and scope of application in accordance with the teachings of the present invention. In conclusion, the content of this specification shall not be construed as a limitation to the invention.

We claim:

1. An isotope mass spectrometer, comprising:
   an electron cyclotron resonance ion source, a front-end analysis device, a back-end analysis device and an ion detector;
   wherein the electron cyclotron resonance ion source is connected with the front-end analysis device, and is used for generating ion beams of multivalent charge states;
   the front-end analysis device is connected with the back-end analysis device, selects and separates the ion beams, and receives ion beams of constant, microscale and trace levels;
   the back-end analysis device is connected with the ion detector, and is used for eliminating a background of an isotope to be measured at an ultratrace level; and
   the ion detector is used for receiving ion beams of the ultratrace level, and carrying out energy measurement and separation on the ion beams of the ultratrace level, so as to obtain the isotope to be measured at the ultratrace level, wherein, the back-end analysis device comprises: a first electrostatic analyzer, an energy absorption film and a speed selector; wherein an input end of the first electrostatic analyzer is connected with an output end of the front-end analysis device, and the energy absorption film is fixed between an output end of the first electrostatic analyzer and an input end of the speed selector; and an output end of the speed selector is connected with the ion detector.

2. The mass spectrometer of claim 1, further comprising: an operation module;

wherein the operation module is connected with an output end of the front-end analysis device, and is used for calculating isotopic abundance ratios of ion beams of constant, microscale and trace levels as received by the front-end analysis device; and the operation module is also connected with an output end of the ion detector, and is also used for calculating the abundance ratio of the isotope to be measured at the ultratrace level as obtained by the ion detector.

3. The mass spectrometer of claim 1, wherein the electron cyclotron resonance ion source is a positive ion source, which can generate ions of multivalent charge states for all elements from H to Pu, actinide elements, and transactinide elements.

4. The mass spectrometer of claim 1, wherein the front-end analysis device particularly comprises: an acceleration section, a first magnetic analyzer and an ion receiver; wherein an ion output end of the acceleration section is connected with an input end of the first magnetic analyzer, and an output end of the first magnetic analyzer is fixed to the ion receiver; the first magnetic analyzer is used for selecting and separating the accelerated ion beams; and the ion receiver is used for receiving the separated ion beams of constant, microscale and trace levels.

5. The mass spectrometer of claim 4, wherein the accelerating section is a single-stage electrostatic accelerating tube which has an accelerated beam intensity in a range of 10 A-10 mA, and a working voltage of 10 kV-600 kV.

6. The mass spectrometer of claim 4, wherein the ion receiver is a set of Faraday cups, and the number of the Faraday cups is 5 to 9.

7. The mass spectrometer of claim 6, wherein the Faraday cups comprise a first Faraday cup and a second Faraday cup which have the same structure; wherein the first Faraday cup is used for receiving the separated ion beams of constant, microscale and trace levels, and the second Faraday cup is used for transmitting the ion beams of the ultratrace level to the back-end analysis device.

8. The mass spectrometer of claim 1, wherein the speed selector of the back-end analysis device is replaced by a second magnetic analyzer and a second electrostatic analyzer, such that the back-end analysis device particularly comprises:

the first electrostatic analyzer, the energy absorption film, the second magnetic analyzer and the second electrostatic analyzer; wherein an input end of the first electrostatic analyzer is connected with an output end of the front-end analysis device, and the energy absorption film is fixed between an output end of the first electrostatic analyzer and an input end of the second magnetic analyzer; and an output end of the second magnetic analyzer is connected with an input end of the second electrostatic analyzer, and an output end of the second electrostatic analyzer is connected with the ion detector.

9. The mass spectrometer of claim 1, wherein the ion detector is a solid detector or a gas detector, the solid detector is a thin-window or windowless solid detector, and the gas detector is a thin-window gas detector.

* * * * *